(12) United States Patent
Pomeroy et al.

(10) Patent No.: US 6,324,974 B1
(45) Date of Patent: Dec. 4, 2001

(54) TREATMENT OF SOLUTIONS

(76) Inventors: Derek William Edgar Pomeroy, Silver Birch, Grove Road, Lydney GL15 5JG (GB); Steven Lionel Kennett, 13 Duval Place, Bagshot OU19 5LP (GB); James Plus Moloney, 20 Marlborough Rise, Camberley GU15 2ED (GB)

( * ) Notice: Subject to any disclaimer, the term of this patent is extended or adjusted under 35 U.S.C. 154(b) by 0 days.

(21) Appl. No.: 09/029,275
(22) PCT Filed: Feb. 24, 1998
(86) PCT No.: PCT/GB96/02082
  § 371 Date: Feb. 24, 1998
  § 102(e) Date: Feb. 24, 1998
(87) PCT Pub. No.: WO97/07978
  PCT Pub. Date: Mar. 6, 1997

(30) Foreign Application Priority Data

Aug. 25, 1995 (GB) .................................................. 9517453

(51) Int. Cl.$^7$ ................................ B41F 7/24; C02F 1/30; C02F 1/48
(52) U.S. Cl. .......................... 101/147; 210/243; 210/748
(58) Field of Search .................................. 101/132.5, 147, 101/148, 450.1, 451, 452; 210/748, 222, 243, 695

(56) References Cited

U.S. PATENT DOCUMENTS

| 4,238,326 | * | 12/1980 | Wolf | 210/695 |
| 4,545,887 | * | 10/1985 | Arnesen et al. | 204/280 |
| 4,801,370 | * | 1/1989 | Arnesen | 204/302 |
| 4,808,287 | * | 2/1989 | Hark | 210/637 |
| 4,865,748 | * | 9/1989 | Morse | 210/748 |
| 4,886,593 | * | 12/1989 | Gibbs | 204/302 |

FOREIGN PATENT DOCUMENTS

| 238945 | * | 9/1986 | (DE) | 101/147 |
| WO 93/19939 | * | 10/1993 | (WO) . | |

* cited by examiner

Primary Examiner—Stephen R. Funk
(74) Attorney, Agent, or Firm—James B. Middleton

(57) ABSTRACT

A fountain solution for a lithographic press is treated by applying a succession of doses of electromagnetic radiation at increasing frequencies, from audio to radio frequencies, via an antenna that is immersed in the fountain solution. The conductive elements of the antenna are sealed within an insulating sheath so as to be out of contact with the fountain solution.

8 Claims, 1 Drawing Sheet

TREATMENT OF SOLUTIONS

BACKGROUND OF THE INVENTION

1. Field of the Invention

This invention relates to the treatment of solutions used in a printing process, and in particular, though not exclusively, to the treatment of dampening or fountain solutions used in lithographic printing.

2. Description of the Related Art

The fountain solution is the liquid which is applied to the printing plate of a lithographic press so as to desensitize the background or non-image areas on the latter, i.e. only those areas that are not to be receptive to ink. It commonly consists of water, to which other substances are usually added for various purposes. In this connection it is conventional to add one or more wetting agents, for example long and short chain alcohols (notably isopropyl alcohol), fatty acid esters, glycol and butanol esters, and a large variety of surfactants. Most of these agents emit volatile organic compounds, which, as has long been recognized in the printing industry, has a major disadvantage, mainly for safety and environmental reasons. Other disadvantages are also well known.

Various ways to reduce or eliminate the use of chemical additives so as to reduce these drawbacks, especially the emission of volatile organic compounds, have been proposed. One of these proposals involves the direct injection of electromagnetic radiation at a radio frequency (typically around 43 KHz) into the solution, via an injector which is coupled to an RF generator by means of a tuned cable.

In this last-mentioned proposal, the injector transmits the RF signals into the fountain solution by means of a conductor which is in direct contact with the liquid to be treated.

SUMMARY OF THE INVENTION

According to the invention in a first aspect, in a method for treating a fountain solution in a printing process by applying electromagnetic radiation to a liquid consisting of the fountain solution itself and/or water for inclusion in the solution, the radiation is applied through an antenna immersed in the liquid, contact between the liquid and electrically conductive elements of the antenna being absent.

In a second aspect, the invention provides apparatus for treating a fountain solution in a printing process, comprising electromagnetic radiation generating means and at least one antenna connected electrically to the generating means for receiving and retransmitting radiation generated by the latter, the antenna comprising a coil impedance-matched to the generating means and a layer of insulating material impervious and inert to the said liquid, the said layer sealing within it all electrically-conductive elements of the antenna.

The apparatus typically operates by broadcasting a wide band of frequencies (for example both audio and radio frequencies) into either the water that is to be used in making and/or mixing the fountain solution, or into the solution itself, or both.

The radiation is preferably applied in successive steps of different frequencies over a predetermined period of time, so that a wide frequency band (e.g. 50 Hz to 11 KHz) is covered, after which the process may be restarted.

The invention is suitable for use in any printing apparatus in which water or an aqueous solution is used for desensitizing the non-image areas. In the context of lithographic printing, it is suitable for use with dampening systems of any type that uses either water or an aqueous fountain solution. These systems include "contact" systems in which the solution is applied mechanically to the plate, e.g. through a set of rollers, either in continuous flow or with the use of a vibrating feed roller or a cloth-covered roller; and "non-contact" systems in which the solution is sprayed or atomized on to the plate.

The invention eliminates the possibility of electrochemical corrosion in the press generally, and in its fountain solution mixing, storage and circulation systems in particular, that would arise where any component of the press in contact with the solution is of a metal such that an electromotive force is set up between such components and a conductive element of the RF injector, where the latter is also in direct contact with the solution. Under such circumstances either the injector element or the other component is very likely to become a sacrificial electrode.

The invention has been shown to produce a significant reduction in the amount of wetting agents required, and also a noticeable reduction in mineral contamination. This improvement manifests itself as a reduction in the deposition of water-receptive minerals, such as the carbonates of calcium and magnesium, on the blankets and the ink and damping rollers of the press.

A further improvement afforded by the invention is that many species of micro-organism, and organisms such as algae and fungi, are rendered moribund in the treated aqueous solution. This reduces the likelihood of blockages in the circulation system, and enables downtime for cleaning to be reduced.

Moreover, under some circumstances the invention is thought to have a lethal effect on certain micro-organisms and other organisms.

Where the fountain solution is applied by a non-contact (spray) type of system, the method and apparatus of the invention inhibits blocking of the fine holes in the spray nozzles by water-hardening agents.

BRIEF DESCRIPTION OF THE DRAWINGS

Embodiments of the invention will now be described, by way of non-limiting example only, with reference to the accompanying drawings, in which.

DESCRIPTION OF THE PREFERRED EMBODIMENTS

Figure 1:
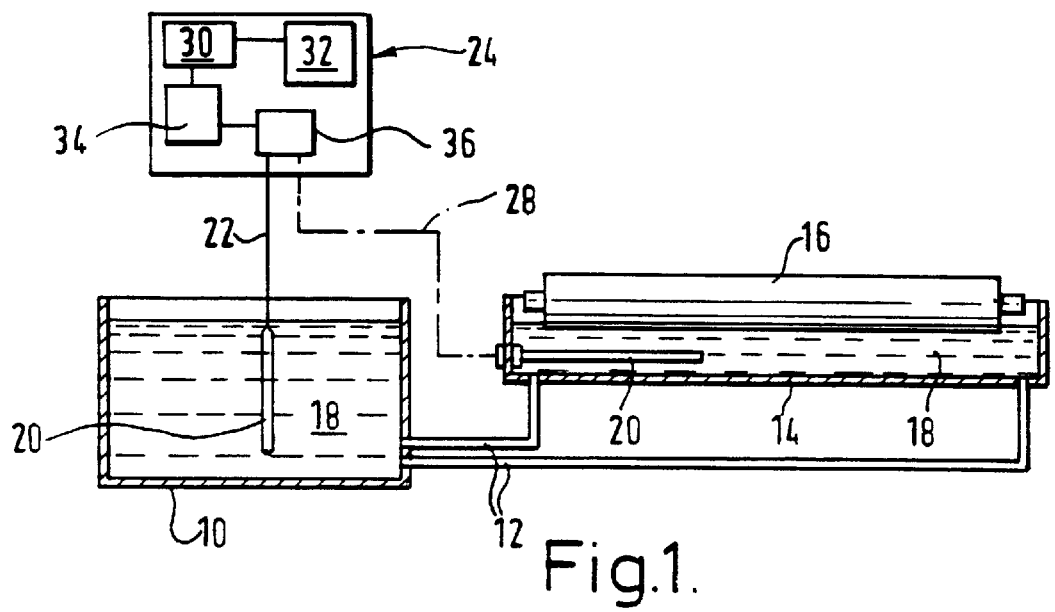
FIG. 1 shows diagrammatically part of a printing press equipped with apparatus according to the invention.

In FIG. 1, a lithographic press has a fountain solution tank 10 connected through flow and return pipes 12 to a fountain solution pan 14, in which a pan roller 16 is in contact with the solution 18 so as to pick up the solution and deliver it, via other suitable rollers not shown, to the plate (not shown) of the press.

An antenna 20 is submerged in the fountain solution 18 in the tank 10. The antenna is connected through a coaxial cable 22 to a control unit 24. Alternatively or in addition, an antenna 20 may be mounted in the pan 14 so as to be submerged in the solution 18 in the pan, being then connected to the unit 24 through a coaxial cable 28.

The control unit 24 can take any suitable form. Here, it comprises a signal generator 30 for producing electrical signals over a range of frequencies, which preferably includes both audio and radio frequencies. The signal generator 30 is controlled by a timing circuit 32 which causes the signal generator to give a signal at a set frequency for a period of time, then another signal at another set frequency for a second period, and so on. The output of the signal generator is connected through suitable circuitry 34 (e.g. an amplifier) to an output coil indicated at 36, which delivers the output signals to the cable 22 and/or 28.

The design of a suitable control unit 24 is within the skill of any person competent in electronic design, and need not be described any further here.

Figure 2:
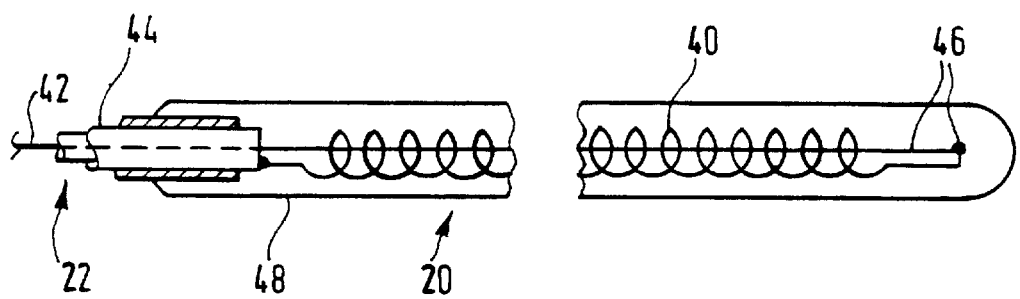
FIG. 2 shows an antenna of such an apparatus.

FIG. 2 shows a typical construction of an antenna 20. It consists essentially of a wire coil 40 connected between the core wire 42 and conductive braid 44 of the coaxial cable 22. The number of turns in the coil 40 depends on the frequencies employed, and it is impedance-matched to the output coil 36 of the control unit 24.

A layer of a suitable shrinkable polymer which is impervious and chemically inert to the solution 18 is applied around the coil 40 and its electrical connections 44, 46, and is heat-shrunk so as to form a sheath 48 which seals all the electrically-conductive elements of the antenna within the sheath, so that no conductive element can make contact with the fountain solution.

In operation, the solution 18 is treated by applying electromagnetic radiation, in the form of the output signals from the coil 36, to the solution via the coil 40 of the antenna 20, which receives these output signals and retransmits them into the fountain solution through its sheath 48, giving the results described earlier herein. In a typical operating sequence, the control unit 24 is so arranged that the signals are transmitted in a cycle consisting of a succession of transmissions (steps), each of 4.5 seconds. Each step is at a frequency 25 Hz higher than the previous step. The cycle starts at a frequency of 50 Hz, and ends at 11 KHz, whereupon the unit 24 reverts to 50 Hz and a new cycle begins.

It will of course be understood that any desired variation may be made to the operating sequence. For example, there may be a pause of any desired duration between each step and the next, and between each cycle and the next; the period of each step can have any desired value; this period may be varied within a cycle, e.g. by having different periods at higher frequencies than at lower frequencies; the frequency difference between one step and the next may be similarly varied; the cycle may be one of decreasing, rather than increasing, frequency; and so on.

There may be a number of signal generators, each working at a different set frequency. Each of these may be associated with its own antenna, so that there is at least one antenna for each frequency used.

The antenna (or at least one antenna) may be located at any desired point in the fountain solution system. For example, instead of, or as well as, an antenna immersed in the mixed solution, there may be an antenna in a water supply tank from which water is taken, to be mixed with other substances so as to form the fountain solution.

What is claimed is:

1. In the method of treating a fountain solution in a lithographic press, said lithographic press including a fountain solution tank for receiving a fountain solution, flow and return pipes connecting said fountain solution tank to a fountain solution pan, and a roller in said fountain solution pan in contact with said fountain solution, said method including the steps of applying electromagnetic radiation to said fountain solution by an antenna in said fountain solution tank, the improvement comprising the step of electrically insulating all electrically conductive elements of said antenna from said fountain solution.

2. A method according to claim 1, wherein the said step of applying electromagnetic radiation includes applying said radiation in a plurality of frequencies.

3. A method according to claim 2, wherein the said plurality of frequencies lie within the range 50 Hz–11 KHz.

4. A method according to claim 2 wherein said electromagnetic radiation is applied in successive steps of different frequencies.

5. A method of treating a fountain solution in a lithographic press, said lithographic press including a fountain solution tank, flow and return pipes connecting said fountain solution tank to a fountain solution pan, a roller in said pan in contact with said fountain solution, and a water tank for supplying water for said fountain solution, said method comprising the step of applying electromagnetic radiation to the water by means of an antenna in said water tank, contact between the water and electrically conductive elements of said antenna being absent.

6. A method according to claim 5, and including the further step of applying electromagnetic radiation to said fountain solution by means of a second antenna in said fountain solution pan, contact between said fountain solution and electrically conductive elements of said second antenna being absent.

7. A method according to claim 5, wherein the said step of applying electromagnetic radiation includes applying said radiation in a plurality of frequencies.

8. A method according to claim 7, wherein said plurality of frequencies lies within the range of 50 Hz to 11 KHz.

* * * * *

UNITED STATES PATENT AND TRADEMARK OFFICE
CERTIFICATE OF CORRECTION

PATENT NO.     : 6,324,974 B1  
DATED          : December 4, 2001  
INVENTOR(S)    : Derek William Edgar Pomeroy et al.

Page 1 of 1

It is certified that error appears in the above-identified patent and that said Letters Patent is hereby corrected as shown below:

<u>Title page,</u>
The third named inventor is corrected to be James Pius Moloney.

Signed and Sealed this

Twenty-first Day of May, 2002

Attest:

Attesting Officer

JAMES E. ROGAN
Director of the United States Patent and Trademark Office